Patented Sept. 27, 1949

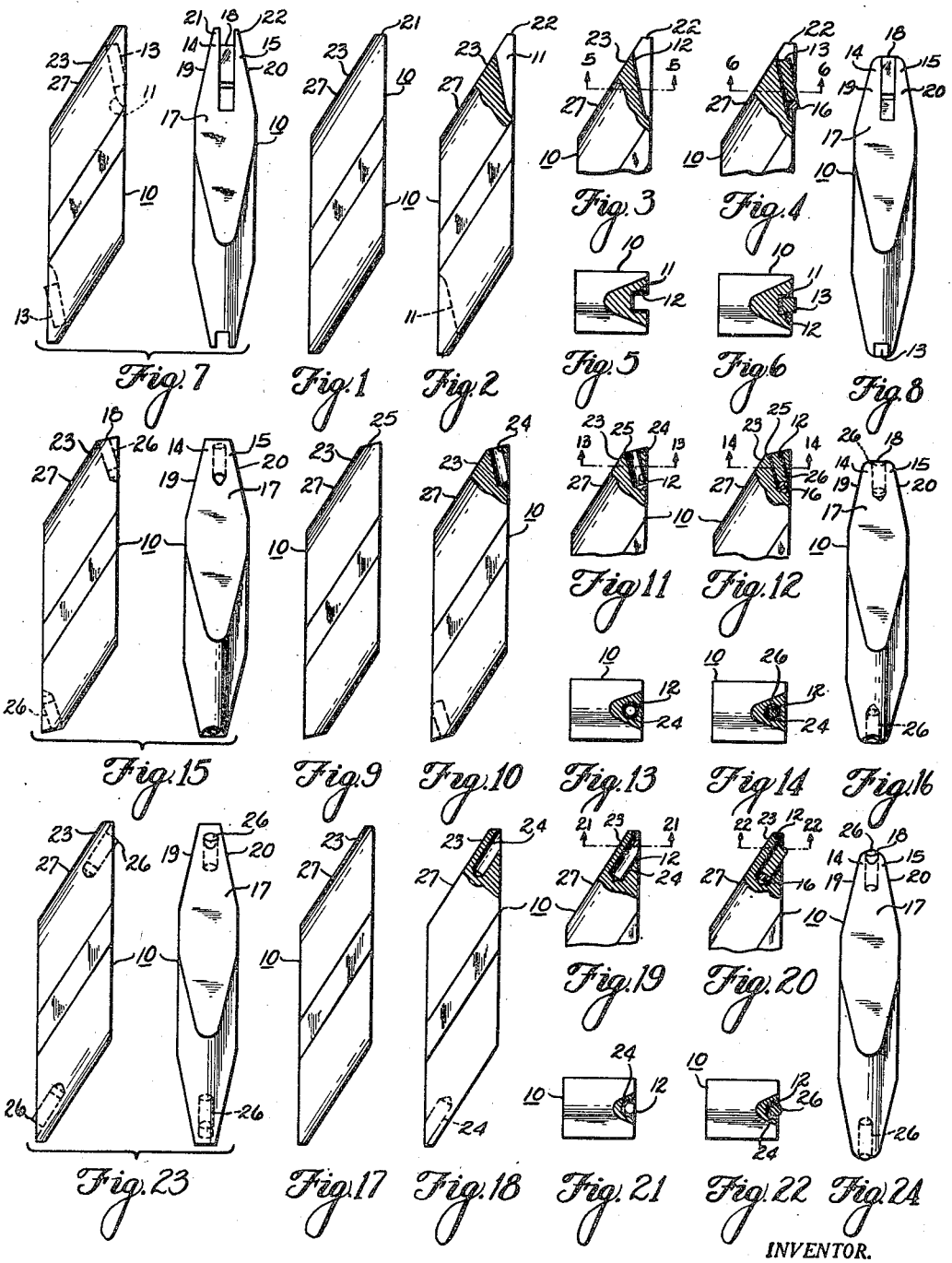

2,483,220

UNITED STATES PATENT OFFICE 2,483,220

BIT

Harry M. Morrow, Canton, Ohio, assignor to The Bowdil Company

Application March 8, 1946, Serial No. 652,972

3 Claims. (Cl. 262—33)

My invention relates in general to cutting bits and more particularly to bits for cutting coal or other substances.

In the mining of coal or other substances, a cleft is cut in the lower level of the vein by means of a cutter bar around which revolves a power driven endless chain carrying a plurality of cutting bits arranged in staggered relationship relative to one another. These cutting bits constitute the subject matter of this invention. The shelf formed by the cleft is subsequently broken off by means of explosives or other suitable methods. When cutting the cleft, in the interest of economy and the saving of power, it is highly desirable that the cutting bits be not only strong and durable, but also efficient in operation and free from drag. Further, it is desirable that these bits present a cutting tip which is long lived and resistant to rapid wear in order that the power driven endless chain carrying the bits may be operated continually until a specific cut is completed. That is, it is desirable that the bits be durable to withstand prolonged abrasive action in order to prevent costly delay in removing the endless chain machine from the cleft before the cleft is finished in order to replace worn bits.

Therefore, an object of my invention is to provide a cutting bit having an extremely hard cutting tip.

Another object of my invention is to provide a cutting bit having a tough and durable body and having an extremely hard cutting tip imbedded therein.

Another object of my invention is the provision of a hard metal insert for the body of a cutting bit which will provide an extremely durable end cutting edge for the bit, and is protected against dislodging impacts by the tough body metal of the cutting bit.

Another object of my invention is the provision of an extremely hard insert for a cutting bit to provide a durable end cutting surface for the bit with the insert automatically exposable by the wearing away of the bit body.

Another object of my invention is to provide a cutting bit having steel side cutting surfaces inclined in the direction of travel for slicing cutting action, and having a hard metal cutting tip insert substantially perpendicular to the surface being cut to provide impact cutting.

Yet another object of my invention, is to provide a cutting bit with a hard metal insert at the cutting tip thereof, with the hard metal insert positioned to contact a surface and cut the surface when the bit is moving in a cutting direction, and said bit having a protecting surface to protect the hard metal insert from dislodging from impacts when the cutting bit is moving in a direction other than the active cutting direction.

Other objects and a fuller understanding of my invention may be had by referring to the following description and claims, taken in conjunction with the accompanying drawings, in which:

Figure 1 is a side elevational view of a rhomboidal shaped coal cutting bit blank to be developed into a bit employing the principles of my invention;

Figure 2 is a side elevational view of the rhomboidal shaped coal cutting bit of Figure 1 with a phantom outline at one cutting tip of a groove provided therein, and showing a portion broken away at the opposite cutting end to reveal the slot;

Figure 3 is a fragmentary portion of a bit with a portion thereof broken away and showing greatly exaggerated a layer of bonding flux on the surface of the slot walls;

Figure 4 is a view similar to the Figure 3 with a hard metal insert and a piece of bonding material positioned in the slot with the bonding flux between the slot surface walls and the insert;

Figure 5 is a cross-sectional view along the line 5—5 of Figure 3;

Figure 6 is a cross-sectional view along the line 6—6 of Figure 4;

Figure 7 is a side and front view of the commercial finished product;

Figure 8 is a front view of the bit after a period of service, or after being dressed by abrasive action;

Figure 9 is a side elevational view of a rhomboidal shaped coal cutting bit blank to be developed into a bit employing the principles of my invention;

Figure 10 is a side elevational view of the rhomboidal shaped coal cutting bit of Figure 9 with a phantom outline at one cutting tip of a recess provided therein, and showing a portion broken away at the opposite cutting end to reveal the recess;

Figure 11 is a fragmentary portion of a bit with a portion thereof broken away and showing greatly exaggerated a layer of bonding flux on the surface of the recess walls;

Figure 12 is a view similar to the Figure 11 with a hard metal insert and a piece of bonding material positioned in the recess with the bonding flux between the recess surface walls and the insert;

Figure 13 is a cross-sectional view along the line 13—13 of Figure 11;

Figure 14 is a cross-sectional view along the line 14—14 of Figure 12;

Figure 15 is a side and front view of the commercial finished product;

Figure 16 is a front view of the bit after a period of service, or after being dressed by abrasive action;

Figure 17 is a side elevational view of a rhomboidal shaped coal cutting bit blank to be developed into a bit employing the principles of my invention;

Figure 18 is a side elevational view of the rhomboidal shaped coal cutting bit of Figure 17 with a phantom outline at one cutting tip of a recess provided therein, and showing a portion broken away at the opposite cutting end to reveal the recess;

Figure 19 is a fragmentary portion of a bit with a portion thereof broken away and showing greatly exaggerated a layer of bonding flux on the surface of the recess walls;

Figure 20 is a view similar to the Figure 19 with a hard metal insert and a piece of bonding material positioned in the recess with the bonding flux between the slot surface walls and the insert;

Figure 21 is a cross-sectional view along the line 21—21 of Figure 19;

Figure 22 is a cross-sectional view along the line 22—22 of Figure 20;

Figure 23 is a side and front view of the commercial finished product;

Figure 24 is a front view of the bit after a period of service, or after being dressed by abrasive action;

Figure 25:
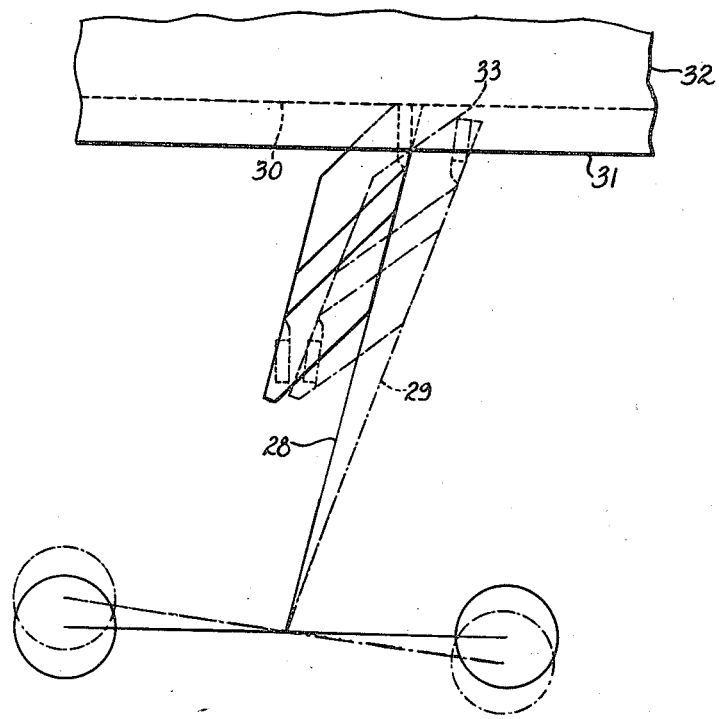
Figure 25 is a diagrammatic illustration of the relative position of a cutting bit carried by an endless chain link, showing the bit in its active cutting position and in its backing drag position.

With reference to the drawings, I illustrate my invention in its preferred embodiment as incorporated in a rhomboidal shaped coal cutting bit. This invention, however, is not limited to bits of rhomboidal shape, but may be readily employed in other types of coal cutting bits, as well as in cutting tools for other purposes in which the mode of cutting is similar. In the mining of coal, these bits are removably mounted in the lugs of an endless power driven chain which revolves around a cutter bar. This device is then moved against the face of a coal vein and a cleft is cut under the vein of coal. Each bit is adapted to contact the coal surface and carve a furrow therein. In carving its furrow, the tip of the bit is forced into the coal and serves to chip out minute pieces of the coal to start the furrow. The side edges of the bit serve to chip away the sides of the furrow and widen the furrow in order that the next bit will be able to descend to the depth of the furrow and carve a new and deeper furrow. Thus, the tip of the bit receives considerably greater wear than the sides of the bit, and is subject to much more severe wearing conditions than the side. In the particular form of rhomboidal bit as illustrated, when one of the cutting points of the bit wears away, the bits are reversible in the holder, giving a double cutting life to the bit. It is extremely desirable to provide a cutting bit which is able to withstand the extreme wearing conditions imposed and maintain an active cutting tip throughout the period of cutting the cleft in order that the cutting operation will not be required to be halted in order to reverse or replace the bits.

In the Figures 1 through 8, I have illustrated one embodiment of my invention. The Figure 1 is a side elevational view of a rhomboidal shaped bit 10 preferably constructed of tough alloy steel and similar to the rhomboidal bit shown in Patent No. 1,677,950, issued to N. K. Bowman on July 24, 1928, and Patent No. 2,217,347, issued to H. M. Morrow on October 8, 1940, both patents of which are assigned to the assignee of the present application. This bit 10 is used as the bit blank in preparing a bit employing the principles of the present invention. Figure 2 of the drawings illustrates in phantom and in a broken away portion the depth and outline form of a groove which may be milled or otherwise cut into the tip of the bit. The cutting of the groove produces two side portions 14 and 15. After this groove 11 is cut, a coating of flux material 12 is coated over the surface of the groove 11. This material 12 may comprise any of the well-known flux materials used in bonding metals together. This flux material is illustrated in the Figures 3 and 5, greatly exaggerated for clarity. The next step in producing my improved bit, is to place an insert 13 in the groove 11 as illustrated in the Figures 4 and 6. The insert is held in place temporarily within the groove 11 by pinching the side portions 14 and 15 of the bit 10 together upon the insert 13.

The insert 13 is bonded in place permanently by a silver solder or other suitable bonding material. In the illustration, I show a piece of silver solder 16 held in the groove in a position relatively near to the insert 13 by pinching in the side portions 14 and 15 in a manner similar to that of the insert 13. The bit 10 with the insert 13 and the bonding material 16 held frictionally within the groove 11 is then placed in a heat treating furnace and elevated in temperature. During the time which the device is held at the elevated temperature, the bonding material 16 is caused to become fluid and will work its way between the insert 13 and the walls of the side portions 14 and 15 by capillary action. The flux 12 assists both in the capillary action, and in the forming of a good bond between the material of the bit 10 and the material of the insert 13 with the bonding material 16. After a predetermined length of time, the bit is removed from the elevated temperature zone and rapidly cooled by quenching in oil or molten salt according to the well-known method of heat treating ferrous material, in order to harden the tough alloy steel comprising the bit 10 and the side portions 14 and 15. Thus, the bit 10 appears as in the Figure 7 of the drawings. In this figure, it will be seen, that the bit comprises a bit body 10 of hardened alloy steel, and having a side portion 14 and a side portion 15 with a groove 11 therebetween. The side portions 14 and 15 and the groove 11 merge with the remainder of the active cutting face 17 of the bit as illustrated. The insert 13 is permanently bonded in the groove 11 by the bonding material 16, which has replaced the flux material 12.

In the position as illustrated, the insert 13 extends to the tip region of the bit 10, and presents an active cutting edge 18 to contact the material to be cut by the tip of the bit. Also apparent from the Figure 7, are two side cuttings edges 19 and 20 on the side portions 14 and 15, respectively. These side cutting edges serve to cut and widen a furrow dug by the cutting edge 18 presented by the insert 13.

From past experience, it has been found that the side cutting edges 19 and 20 will operate more satisfactorily when inclined at an angle to the surface being cut. That is, the side cutting edges 19 and 20 should preferably have an "askew" action. However, when using hard and brittle materials as an insert, it has been found that an impact surface is most operative. Therefore, the insert 13 is positioned at an angle to the cutting face 17, as illustrated in the Figure 7. This relationship of the side cutting edges 19 and 20 and the end cutting edge 18 is further illustrated in the Figure 25.

In the Figure 7, the side portions 14 and 15 are illustrated with two relatively sharp points 21 and 22 on the side portions 14 and 15 respectively. In this particular modification of the invention, the sharp points 21 and 22 are incidental to manufacture. These sharp points will soon wear away or break off after the bit 10 is mounted in the cutter chain and placed in operation. Thereafter the cutting edge 18 will be exposed for active cutting service. However, these sharp points 21 and 22, as well as a portion of the side portions 14 and 15, may be removed by grinding before the bit 10 is placed in operation if desired, as shown in Figure 8. As before indicated, these excess portions are automatically removed after a period of actual cutting operations, and therefore, for all intents and purposes the bit 10 may be placed in operation as illustrated in the Figure 7. After the bit 10 has been placed in operation for a period of time, or after the excess portions have been removed by grinding, the bit will appear as illustrated in the face view in Figure 8. Therefore, although the finished bit as presented to the operators will preferably be furnished as shown in the Figure 7, the actual working bit will appear substantially as shown in the Figure 8.

The insert 13, as before explained, is provided for the purpose of furnishing an end cutting surface for the bit which is extremely durable to prolong the active cutting life of the bit. Therefore, an extremely hard material is preferable for the insert 13. The type of material available for this purpose includes sintered metal products which have been developed and which are suitable for this purpose. "Carboloy" is an example of one such material. These materials are so extremely hard, that practical methods of forming or shaping a product after once being sintered have not been found. Abrasive action, such as by a grinding wheel, is the only means available today to work or form a sintered product after sintering. The sintered material, however, is extremely brittle and possesses a relatively low tensile strength. Therefore, it must be protected against bending stresses and pulling or tensile stresses. The most desirable characteristic of the product, then, is its extreme hardness and resistance to wear, but it must be protected by a backing surface of a more ductile although softer material, such as ferrous products from which the bit 10 is made.

My improved structure provides the protection required to make the use of a hard metal insert 13 practical. In my structure, the side portions 14 and 15 protect the sides of the insert 13 in such a manner that side impacts against a portion of the insert which is not backed up by a backing member will be prevented. But when the cutting bit is advancing in the direction of its active cutting face 17, the insert 13 will present a cutting edge 18 which will be entirely backed up by the tougher but softer metal of the bit 10. The portion of the bit 10 lying directly back of the insert 13 and serving as the backing therefor may be designated as the backing portion 23 of the bit 10.

In operation, as previously explained, the excess material surrounding the tip of the insert 13 will be removed by the abrasive action of the cutting operation. Thereafter, the edge 18 of the insert 13 will be exposed to contact the surface to be cut. The edge 18 will cut a considerably larger quantity of material than the hardened alloy steel from which the bit 10 may be made. As the wearing continues during the cutting operation, the side portions 14 and 15 will be steadily worn back to continually expose more of the insert 13. That is, as the bit moves in its cutting operation, the insert cutting edge 18 will be worn back slowly, but as it is worn back the side portions 14 and 15 will be worn back also to continually expose the cutting edge 18. Also during the cutting operation, the cutting edges 19 and 20 of the portions 14 and 15 will remove the side surfaces of the furrow being cut and enlarge the furrow for the next bit to enter. By this arrangement of parts in my improved cutting bit, therefore, I have provided a cutting bit having a cutting edge which is a composite of at least three cutting edges. That is, the cutting edge for the bit as it is produced and illustrated in the Figure 7, will comprise the side cutting edges 19 and 20 and the end cutting edge 18. These cutting edges constitute a composite cutting edge for the bit and by the several edges operating in conjunction with one another they will contact the entire surface of the furrow being cut. Of course, after a period of use or after the bit 10 is ground as illustrated in the Figure 8, the cutting edge 18 of the insert 13 and the side cutting edges 19 and 20 will be combined to form a continuous cutting edge which will make the entire cut together as one unit.

The Figures 9 through 16 illustrate a second alternative method of producing a bit in accordance with the principles of my invention. In this modification, a recess opening 24 is provided in the bit 10 from a flattened end surface 25, and the bottom of the recess extends to the face of the cutting bit. As illustrated, this recess opening 24 is provided at an angle to the surface 17 substantially the same as the angle which the insert 13 will assume in the modification illustrated in the Figures 1 through 8. An insert 26 is provided to be placed in the opening 24 and is bonded thereto in a manner similar to the method discussed in connection with the bonding of the insert 13 in the groove 11. Gases formed during the bonding operation may escape from the recess through the bottom thereof. The cutting bit produced by this mode of construction will operate in substantially the same manner as the manner described in connection with the insert 13, with the possible exception that a protecting surface will be provided by the walls of the opening 24 completely around the insert 26 until the end thereof is exposed by wear of the hardened alloy steel bit body as previously explained.

The Figures 17 through 24 illustrate still another modification of my invention in which an opening 24 is cut from the face 17 inwardly of the bit body backing portion substantially parallel to the edge 27 of the bit 10. Again, the bit insert is inserted and bonded to the bit in the manner previously described. Sufficient clearance is provided between the insert and the side wall of the recess 24 to allow gases to escape during the bonding operation.

During the operation of cutting a cleft for the coal with the coal cutting machine carrying the bits thereabout, the bit often encounters an obstruction which will require a smaller cut for each revolution of the chains, or an excess of loose materials will bind the machine, or other conditions will happen which will require the cutting chain to be reversed for a period of time in order to free the chain. Thus, the cutting bit 10 will not always be operating in a forward position, but will often be backing up away from its cutting direction. During this backing up period, the bit will drag across the surface of the coal, and will also encounter material which will deliver impact blows to the bit. With cutting machines employing endless chains as described, there is a considerable amount of opportunity for the individual links of the chain which carry the bits to be displaced from their normal free running position when outside forces are experienced. That is, during the cutting operation, a large leverage force is applied to the link and bit due to the driving force on the link and the dragging force on the tip of the cutter bit. It will readily be seen, therefore, that the links will tend to lean over backwards in a direction opposite to the direction of travel. Therefore, the bit holder and the bit are provided to compensate for this amount of movement and present the bit to the cutting surface at the proper cutting angle. This position is illustrated by the full heavy lines illustrated by the reference character 28 in the Figure 25. Likewise, when the cutting machine is reversed and the drag is on the opposite side of the cutting tip, the links will tend to flop over to the other extreme, and is illustrated diagrammatically by the dot-dash line indicated by the reference character 29 of Figure 25.

As previously explained, the hard material from which the inserts are made is very brittle and has little resistance to bending stresses, tensile stresses and chipping action. Therefore, a bit construction which does not fully protect the insert from chipping actions on the side thereof, or impacts from the reverse direction on the cutting edge, will allow chipping and consequent destruction of the bit's usefulness. My bit construction has taken cognizance of this danger imposed upon the hard metal insert when the bit is traveling in a reverse direction. It will be seen, that in each of the three modifications of the cutting bit shown, that if the bit 10 be tilted into the position as illustrated in the diagrammatic dot-dash position 29 of Figure 25, a protecting surface is provided by the backing portion 23 to take all direct blows and protect the insert. For example, the bit illustrated in the Figure 25 may be considered to be either the modification illustrated in the Figure 7 or the Figure 8 after the bit has been worn to remove the excess bit material. At all times in the life of the bit, and particularly after having been worn for some period of time, the bit backing portion 23 will provide a definite backing for the insert even at the extreme end thereof. As wear continues, the portion backing the cutting tip of the insert will be even greater. In the Figure 25, the dotted line 30 pictures diagrammatically the bottom of a furrow cut in the face 31 of a vein of coal 32. It will be seen, from this illustration that the end of the bit has been worn flat on the tip thereof by the abrasive action of the coal and has provided a corner 33 on the bit backing portion 23. This corner 33 acts as a bumper to ward off impact blows and protect the insert when the bit is moving in a reverse direction. This safety feature, coupled with the protecting side walls surrounding the bits, serves to protect the insert and protects it from impact blows that would destroy the insert and the usefulness of the bit in a period of time without this protection.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A cutting bit, comprising a bit body provided with a cutting end and having an active cutting face and a face backing portion, said backing portion having an edge surface approaching said face surface at an acute angle, a recess extending inwardly of said bit, said recess extending from said active cutting face into said backing portion and lying substantially parallel to said backing portion edge surface, a hard metal insert positioned in said recess, said insert being exposable by the wearing away of the active cutting face.

2. A cutting bit, comprising a bit body provided with a cutting end and having an active cutting face with side cutting edges and a face backing portion, said backing portion having an edge surface approaching said face surface at an acute angle, a recess extending inwardly of said bit, said recess extending from said active cutting face into said backing portion and lying substantially parallel to said backing portion edge surface, a hard metal insert positioned in said recess, said insert being exposable by the wearing away of the active cutting face, the exposed portion of said insert and said face side cutting edges forming a continuous cutting edge for the bit.

3. A double ended bit comprising a solid piece of metal having substantially parallel side edges and substantially parallel opposite end cutting faces offset relative to one another, said edges and faces defining a substantially rhomboidal cutting bit, cutting tips at the opposed sharper angles of the rhomboid, each of said tips having a recess extending from the cutting face inwardly of the solid metal piece substantially parallel to an adjacent side edge, a hard metal insert receivable in said recess and being bonded to the walls thereof.

HARRY M. MORROW.

REFERENCES CITED

The following references are of record in the file of this patent:

UNITED STATES PATENTS

| Number | Name | Date |
| --- | --- | --- |
| 1,908,161 | Meutsch | May 9, 1933 |
| 2,255,856 | Morrow | Sept. 16, 1941 |

FOREIGN PATENTS

| Number | Country | Date |
| --- | --- | --- |
| 606,703 | Germany | Nov. 22, 1934 |
| 670,880 | Germany | Jan. 26, 1939 |